US009159262B2

(12) United States Patent
Kikuchi et al.

(10) Patent No.: US 9,159,262 B2

(45) Date of Patent: Oct. 13, 2015

(54) DISPLAY APPARATUS

(71) Applicant: Sony Corporation, Tokyo (JP)

(72) Inventors: Ken Kikuchi, Tokyo (JP); Takaaki Sugiyama, Kanagawa (JP); Takehiro Misonou, Kanagawa (JP); Genichiro Oga, Kanagawa (JP); Takahiro Kita, Kagoshima (JP)

(73) Assignee: Sony Corporation, Tokyo (JP)

( * ) Notice: Subject to any disclaimer, the term of this patent is extended or adjusted under 35 U.S.C. 154(b) by 2 days.

(21) Appl. No.: 14/224,124

(22) Filed: Mar. 25, 2014

(65) Prior Publication Data

US 2014/0292745 A1 Oct. 2, 2014

(30) Foreign Application Priority Data

Apr. 1, 2013 (JP) ................................ 2013-075883

(51) Int. Cl.

| | |
|---|---|
| ***G09G 3/30*** | (2006.01) |
| ***G09G 3/36*** | (2006.01) |
| ***G09G 5/00*** | (2006.01) |
| ***G06F 3/038*** | (2013.01) |
| ***G09G 3/10*** | (2006.01) |
| ***G09G 3/32*** | (2006.01) |

(52) U.S. Cl.

CPC ........................................ *G09G 3/32* (2013.01)

(58) Field of Classification Search

CPC ......... G09G 5/00; G09G 3/32; G09G 3/3275; G09G 3/3233; G09G 3/3241; G09G 3/3258

See application file for complete search history.

(56) References Cited

U.S. PATENT DOCUMENTS

| | | | | |
|---|---|---|---|---|
| 2002/0047817 | A1* | 4/2002 | Tam | 345/76 |
| 2003/0020413 | A1* | 1/2003 | Oomura | 315/169.3 |
| 2003/0142048 | A1* | 7/2003 | Nishitani et al. | 345/82 |
| 2007/0075939 | A1* | 4/2007 | Cho et al. | 345/76 |
| 2007/0152934 | A1* | 7/2007 | Maeda | 345/92 |
| 2007/0222718 | A1* | 9/2007 | Takahara | 345/76 |
| 2011/0205206 | A1* | 8/2011 | Yoo et al. | 345/211 |
| 2011/0216056 | A1* | 9/2011 | Yoo et al. | 345/212 |

FOREIGN PATENT DOCUMENTS

JP 2003-223136 A 8/2003

* cited by examiner

*Primary Examiner* — Quan-Zhen Wang
*Assistant Examiner* — Lin Li
(74) *Attorney, Agent, or Firm* — Wolf, Greenfield & Sacks, P.C.

(57) ABSTRACT

A display apparatus includes pixels arranged in a two-dimensional matrix pattern, each of which including a light-emitting unit and a drive circuit that drives the unit and includes a comparator circuit that compares a control pulse with potential based on signal voltage and outputs predetermined voltage based on the result, a transistor driving the unit in response to the predetermined voltage, and a current source that supplies current to the unit during driving of the transistor, includes a current-source transistor, a capacity unit connected to a gate electrode of the current-source transistor, a differential amplifier that detects a differential between voltage based on reference constant current and reference voltage, and a transistor controlling the voltage based on reference constant current depending on current flowing through the current-source transistor, and controls gate potential of the current-source transistor on the basis of output of the amplifier in synchronization with a scanning signal.

10 Claims, 11 Drawing Sheets

DISPLAY APPARATUS

CROSS REFERENCE TO RELATED APPLICATIONS

This application claims the benefit of Japanese Priority Patent Application JP 2013-075883 filed Apr. 1, 2013, the entire contents of which are incorporated herein by reference.

BACKGROUND

The present disclosure relates to a display apparatus.

A light emitting diode display apparatus using a light emitting diode (LED) as a light emitting element has been developed extensively. In the light emitting diode display apparatus, a light emitting unit formed of a red light emitting diode functions as a red light emitting sub-pixel, a light emitting unit formed of a green light emitting diode functions as a green light emitting sub-pixel, a light emitting unit formed of a blue light emitting diode functions as a blue light emitting sub-pixel, and a color image is displayed by light emission of the three types of sub-pixels. For example, in a full HD (high definition) full color display apparatus of 40 inches in diagonal size, the number of pixels of the screen thereof in the horizontal direction is 1920 and the number of pixels of the screen in the vertical direction is 1080. Therefore, in this case, the number of light emitting diodes to be mounted is 1920×1080×(the number of the three types of light emitting diodes of the red light emitting diode, the green light emitting diode, and the blue light emitting diode that are necessary for constituting one pixel), i.e., about 6 million.

In an organic electroluminescence display apparatus (hereinafter, abbreviated as organic EL display apparatus) using an organic electroluminescence element (hereinafter, abbreviated simply as organic EL element) as a light emitting unit, a variable constant current driving method in which the light emitting duty is fixed is widely used for a drive circuit that drives the light emitting unit. From a viewpoint of reducing the variation in light emission, a PWM driving organic EL display apparatus is disclosed in, for example, Japanese Patent Application Laid-open No. 2003-223136. In the method of driving an organic EL display apparatus disclosed in Japanese Patent Application Laid-open No. 2003-223136, a video signal voltage is written to all pixels in a state where light emission of current drive type light emitting elements in the pixels is stopped in a first period of time of one frame period of time, and current drive type light emitting elements of the pixels are caused to emit light simultaneously in at least one period of time of light emission determined by the video signal voltage written to each pixel in a second period of time of the one frame period of time subsequent to the first period of time.

SUMMARY

Meanwhile, it is considered that a circuit (current write type circuit) configured to connect a reference constant current supply unit (reference constant current source) to the current source of each pixel, to cause a desired constant current to actually flow through the current source of the pixel, to hold the gate potential of the current source transistor at this time, and to generate a constant current depending on the gate potential in the light emission interval is favorably used for a method of achieving a constant current source in terms of current accuracy. However, in order to connect the reference constant current source to the current source of each pixel, there is a need to provide a long-distance wiring therebetween. The change in gate potential of the current source transistor is reduced due to the impedance of the wiring, thereby causing a so-called settling problem of taking a lot of time for the potential to converge.

In view of the above, it is desirable to provide a display apparatus capable of solving the settling problem of taking a lot of time for the gate potential of the current source transistor to converge.

According to a first embodiment of the present disclosure, there is provided a display apparatus, including a plurality of pixels arranged in a two-dimensional matrix pattern, each of the plurality of pixels including a light emitting unit and a drive circuit configured to drive the light emitting unit, the drive circuit including a comparator circuit configured to compare a control pulse with a potential based on a signal voltage and to output a predetermined voltage based on the comparison result, a transistor for driving a light emitting unit configured to drive the light emitting unit in response to the predetermined voltage output from the comparator circuit, and a current source configured to supply a current to the light emitting unit during driving of the transistor for driving a light emitting unit, the current source including a current source transistor configured to output the current, a capacity unit connected to a gate electrode of the current source transistor, a differential amplifier configured to detect a differential between a voltage based on a reference constant current and a reference voltage, and a transistor configured to control the voltage based on a reference constant current depending on a current flowing through the current source transistor, the current source being configured to control a gate potential of the current source transistor on the basis of an output of the differential amplifier in synchronization with a scanning signal.

According to a second embodiment of the present disclosure, there is provided a display apparatus, including a plurality of pixels arranged in a two-dimensional matrix pattern, each of the plurality of pixels including a light emitting unit and a drive circuit configured to drive the light emitting unit, the drive circuit including a comparator circuit configured to compare a control pulse with a potential based on a signal voltage and to output a predetermined voltage based on the comparison result, a transistor for driving a light emitting unit configured to drive the light emitting unit in response to the predetermined voltage output from the comparator circuit, and a current source configured to supply a current to the light emitting unit during driving of the transistor for driving a light emitting unit, the current source including a current source transistor configured to output the current, and a capacity unit connected to a gate electrode of the current source transistor, the current source being configured to supply a voltage set for each pixel to the gate electrode of the current source transistor in synchronization with a scanning signal.

In the display apparatus according to the first embodiment of the present disclosure, the differential amplifier controls the gate potential of the current source transistor in such a way that the voltage based on the reference constant current corresponds to the reference voltage, thereby solving the settling problem of taking a lot of time for the gate potential of the current source transistor to converge.

Moreover, in the display apparatus according to the second embodiment of the present disclosure, the voltage set for each pixel is supplied to the gate electrode of the current source transistor, i.e., the gate potential of the current source transistor is directly written, thereby solving the settling problem of taking a lot of time for the gate potential of the current source transistor to converge.

These and other objects, features and advantages of the present disclosure will become more apparent in light of the following detailed description of best mode embodiments thereof, as illustrated in the accompanying drawings.

DETAILED DESCRIPTION OF EMBODIMENTS

Figure 1A:
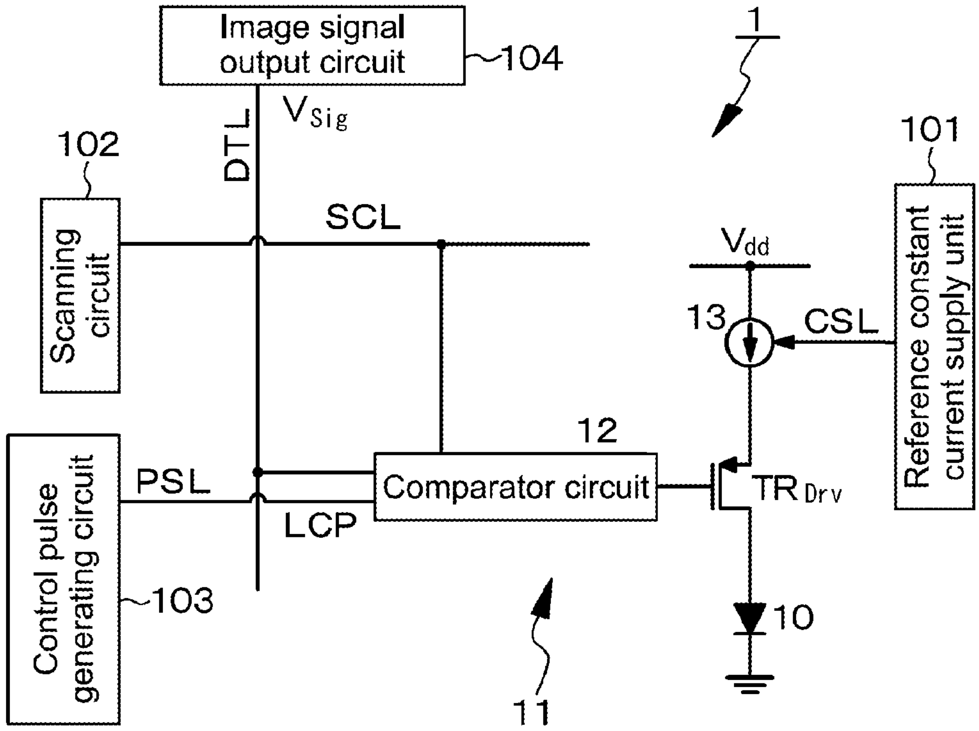
FIG. 1A is a conceptual diagram of a pixel and the like including a light emitting unit and a drive circuit in a display apparatus according to an example 1.

Hereinafter, embodiments of the present disclosure will be described on the basis of examples with reference to the drawings. However, the present disclosure is not limited to the examples and various numerical values and materials in the examples are given for exemplary purposes. In the following description, the same elements or elements having the same function will be denoted by the same reference symbols and repeated description will be omitted. It should be noted that the description will be made in the following order.

1. Display Apparatuses according to Embodiments of Present Disclosure, General Description
2. Example 1 (Display Apparatus according to Embodiment of Present Disclosure (Display Apparatus according to First Embodiment))
3. Example 2 (Modified Example of Example 1 (Display Apparatus according to Second Embodiment))
4. Example 3 (Modified Example of Examples 1 and 2), Others (Display Apparatuses according to First Embodiment and Second Embodiment of Present Disclosure, General Description)

In the display apparatus according to the first embodiment of the present disclosure, the reference constant current may be supplied to the current source of each pixel through a current supply line provided for each column of the plurality of pixels arranged in a two-dimensional matrix pattern. Moreover, the output of the differential amplifier may be supplied to the gate electrode of the current source transistor via a transistor that turns on and off in synchronization with the scanning signal.

In the display apparatus according to the second embodiment of the present disclosure, the voltage supplied to the gate electrode of the current source transistor may be set corresponding to variations in characteristics of the current source transistors of the plurality of pixels. Moreover, the voltage supplied to the gate electrode of the current source transistor may be set corresponding to variations in characteristics of the light emitting units of the plurality of pixels.

In the display apparatuses according to the first embodiment and the second embodiment of the present disclosure, which have the various favorable configurations and forms described above, the plurality of pixels are arranged in a first direction and a second direction in a two-dimensional matrix pattern. In some cases, a group of pixels arranged along the first direction is referred to as "column direction pixel group" and a group of pixels arranged along the second direction is referred to as "row direction pixel group." In the case where the first direction is a vertical direction of the display apparatus and the second direction is a horizontal direction of the display apparatus, the column direction pixel group represents a group of pixels arranged in the vertical direction and the row direction pixel group represents a group of pixels arranged in the horizontal direction.

In the display apparatuses according to the first embodiment and the second embodiment of the present disclosure, which have the various favorable configurations and forms described above, the plurality of pixels may be arranged in a first direction and a second direction in a two-dimensional matrix pattern, a group of the plurality of pixels may be divided into p pixel blocks along the first direction, and the light emitting units of each pixel block may be driven to simultaneously emit light sequentially from the light emitting units constituting pixels of a first pixel block to the light emitting units constituting pixels of a p-th pixel block and, when the light emitting units constituting pixels of a part of pixel blocks are driven to emit light, the light emitting units constituting pixels of the other pixel blocks may not be driven to emit light.

In the display apparatuses according to the first embodiment and the second embodiment of the present disclosure, which have the various favorable configurations and forms described above, the light emitting unit may be configured to emit light a plurality of times on the basis of a plurality of control pulses. In this case, the time interval of the plurality of control pulses is favorably constant.

In the display apparatuses according to the first embodiment and the second embodiment of the present disclosure, which have the various favorable configurations and forms described above, the number of control pulses in one display frame may be greater than the number of control pulses supplied to the drive circuit in the one display frame. This form can be achieved by generating a series of a plurality of control pulses in one display frame, masking a part of the series of a plurality of control pulses, and supplying no control pulse to a drive circuit including pixels in one group of pixels when light emitting unit constituting the pixels in one group of pixels are not caused to emit light.

Furthermore, in the display apparatuses according to the first embodiment and the second embodiment of the present disclosure, which have the various favorable configurations and forms described above, the light emitting units of at least any one of the pixel blocks may be configured to emit light in one display frame. Alternatively, the light emitting units of at least one of the pixel blocks may not be caused to emit light in one display frame.

Furthermore, in the display apparatuses according to the first embodiment and the second embodiment of the present disclosure, which have the various favorable configurations and forms described above, it is favorable that an absolute value of a voltage of the control pulse increases and then decreases as time passes. With this configuration, it is possible to cause the light emitting units constituting the pixels in each pixel block to emit light at the same timing. Specifically, it is possible to align (match) the temporal centers of gravity of light emission of the light emitting units constituting the pixels in each pixel block with each other. In this case, it is favorable to perform gamma correction with the voltage of the control pulse that changes as time passes. Accordingly, it is possible to simplify the entire circuit of the display apparatus. It should be noted that the absolute value of the change rate (differential value) of the voltage of the control pulse with time being a variable is favorably proportional to the constant 2.2.

Furthermore, in the display apparatuses according to the first embodiment and the second embodiment of the present disclosure, which have the various favorable configurations and forms described above, the light emitting unit may include a light emitting diode (LED). The light emitting diode may have a well-known configuration and structure. Specifically, depending on the light emission color of the light emitting diode, it only needs to select a light emitting diode that has the optimal configuration and structure and is prepared from an appropriate material. In a display apparatus using the light emitting diode as the light emitting unit, a light emitting unit formed of a red light emitting diode functions as a red light emitting sub-pixel, a light emitting unit formed of a green light emitting diode functions as a green light emitting sub-pixel, a light emitting unit formed of a blue light emitting diode functions as a blue light emitting sub-pixel, one pixel includes the three types of sub-pixels, and a color image can be displayed by light emission of the three types of sub-pixels. It should be noted that because "one pixel" in the embodiment of the present disclosure corresponds to "one sub-pixel" in such a display apparatus, the "one sub-pixel" in such a display apparatus only has to be replaced with the "one pixel." In the case where the one pixel includes the three types of sub-pixels, the sub-pixels can be arranged in a delta pattern, a stripe pattern, a diagonal pattern, or a rectangle pattern. By driving the light emitting diode at a constant current on the basis of a PWM driving method, it is possible to prevent the spectrum wavelength of the light emitting diode from blue-shifting. It is also possible to apply the light emitting diode to a projector that corrects light emitted from three panels using a dichroic prism, the three panels being prepared by including a first panel, a second panel, and a third panel, the first panel including a light emitting unit formed of a red light emitting diode, the second panel including a light emitting unit formed of a green light emitting diode, the third panel including a light emitting unit formed of a blue light emitting diode.

Furthermore, in the display apparatuses according to the first embodiment and the second embodiment of the present disclosure, which have the various favorable configurations and forms described above, signal write transistors in the pixels of one column arranged in the second direction (row direction pixel group) may operate simultaneously in each pixel block. With the configuration, in each pixel block, the simultaneous operation of the signal write transistors in the row direction pixel group may be performed sequentially from signal write transistors of all pixels in a first row arranged in the first direction (first row direction pixel group) to signal write transistors of all pixels in the last row (last row direction pixel group). Further, in each pixel block, the simultaneous operation of the signal write transistors in the row direction pixel group may be performed sequentially from the signal write transistors in the first row direction pixel group to the signal write transistors in the last row direction pixel group before the control pulse is supplied to the pixel block. It should be noted that in some cases, the period of time in which the simultaneous operation of the signal write transistors in the row direction pixel group may be performed sequentially from the signal write transistors in the first row direction pixel group to the signal write transistors in the last row direction pixel group in each pixel block is referred to as "signal voltage writing period of time," and the period of time in which the light emitting units constituting the pixels in each pixel block emit light simultaneously is referred to as "pixel block light emitting period of time."

Example 1

Figure 1B:
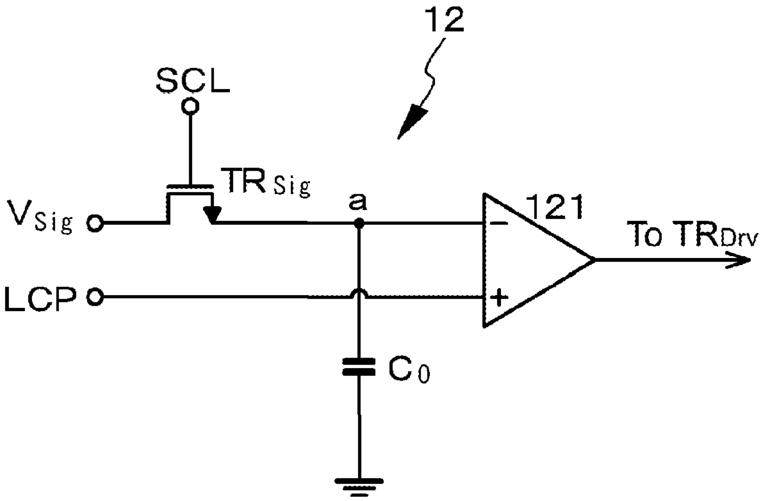
FIG. 1B is a circuit diagram of a comparator circuit constituting a drive circuit in the display apparatus according to the example 1.
Figure 2:
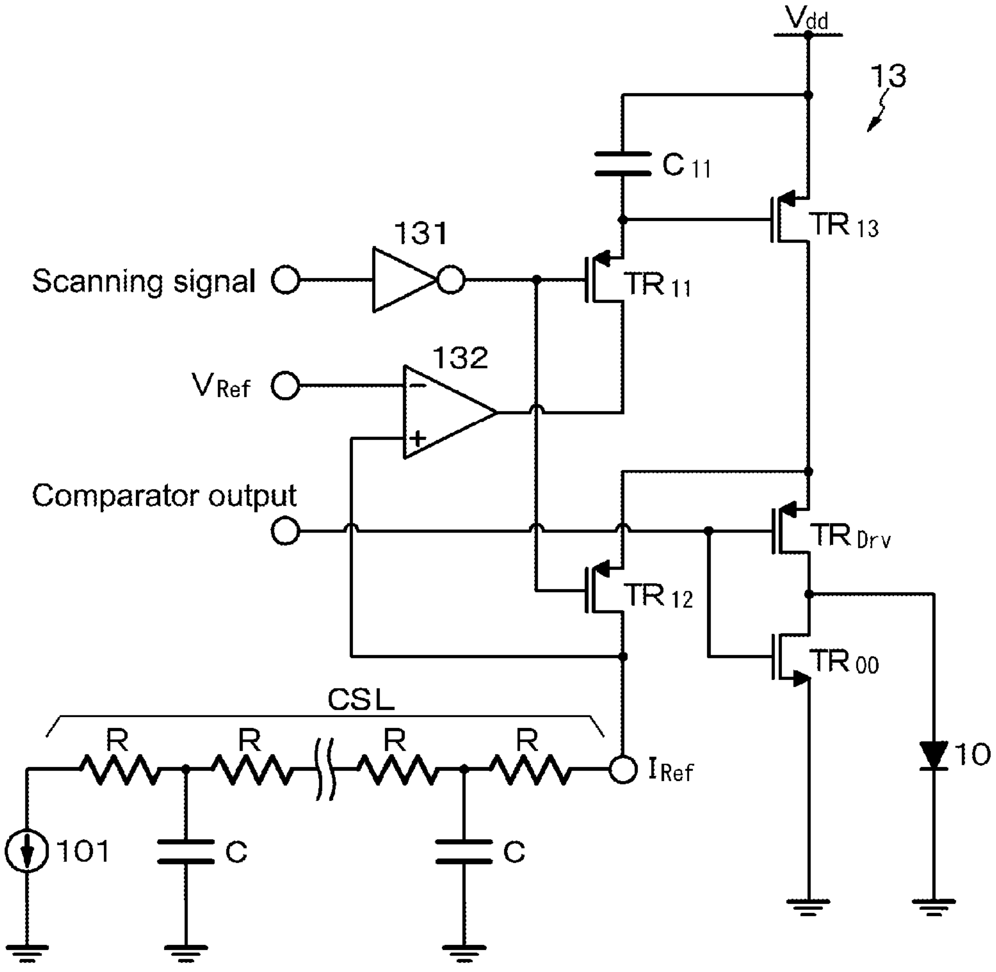
FIG. 2 is a circuit diagram of a current source including a current write type constant current circuit, which constitutes the drive circuit in the display apparatus according to the example 1.
Figure 3:
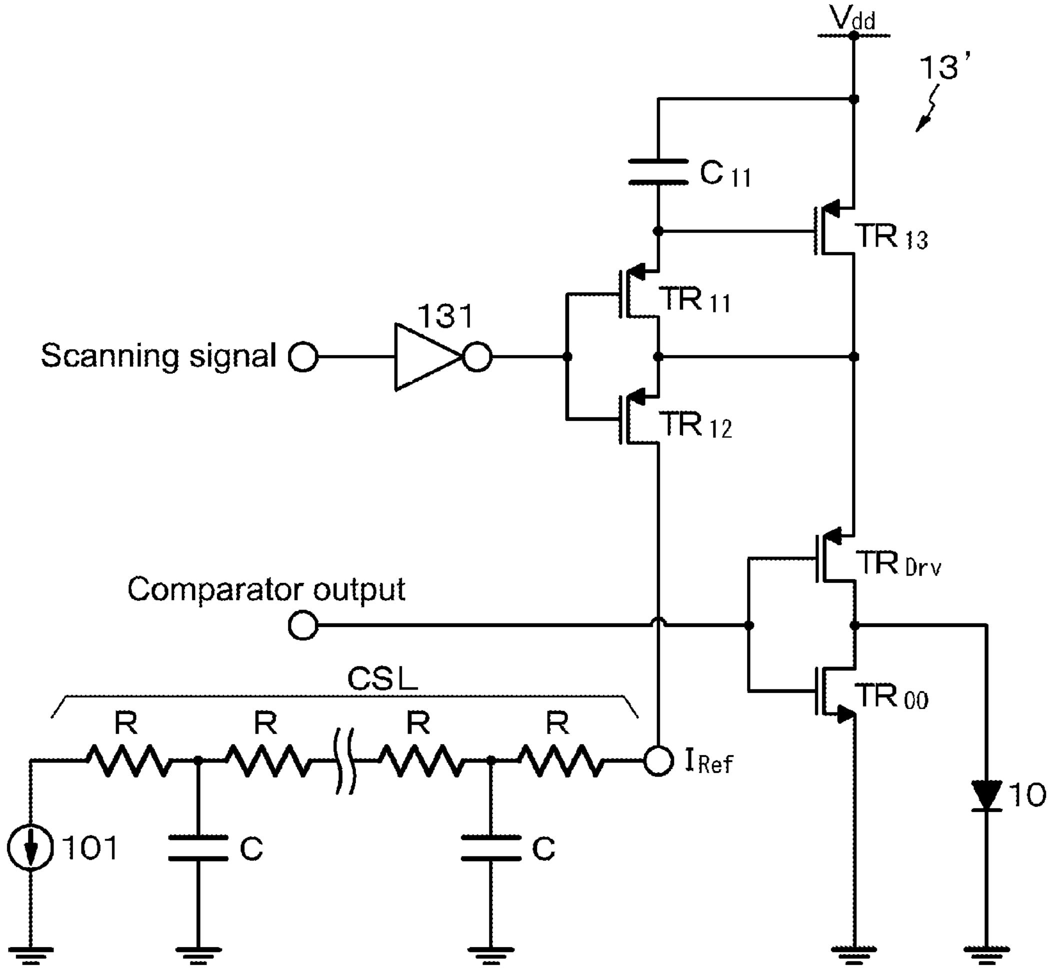
FIG. 3 is a circuit diagram of a current source including a current write type constant current circuit according to a reference example.
Figure 4:
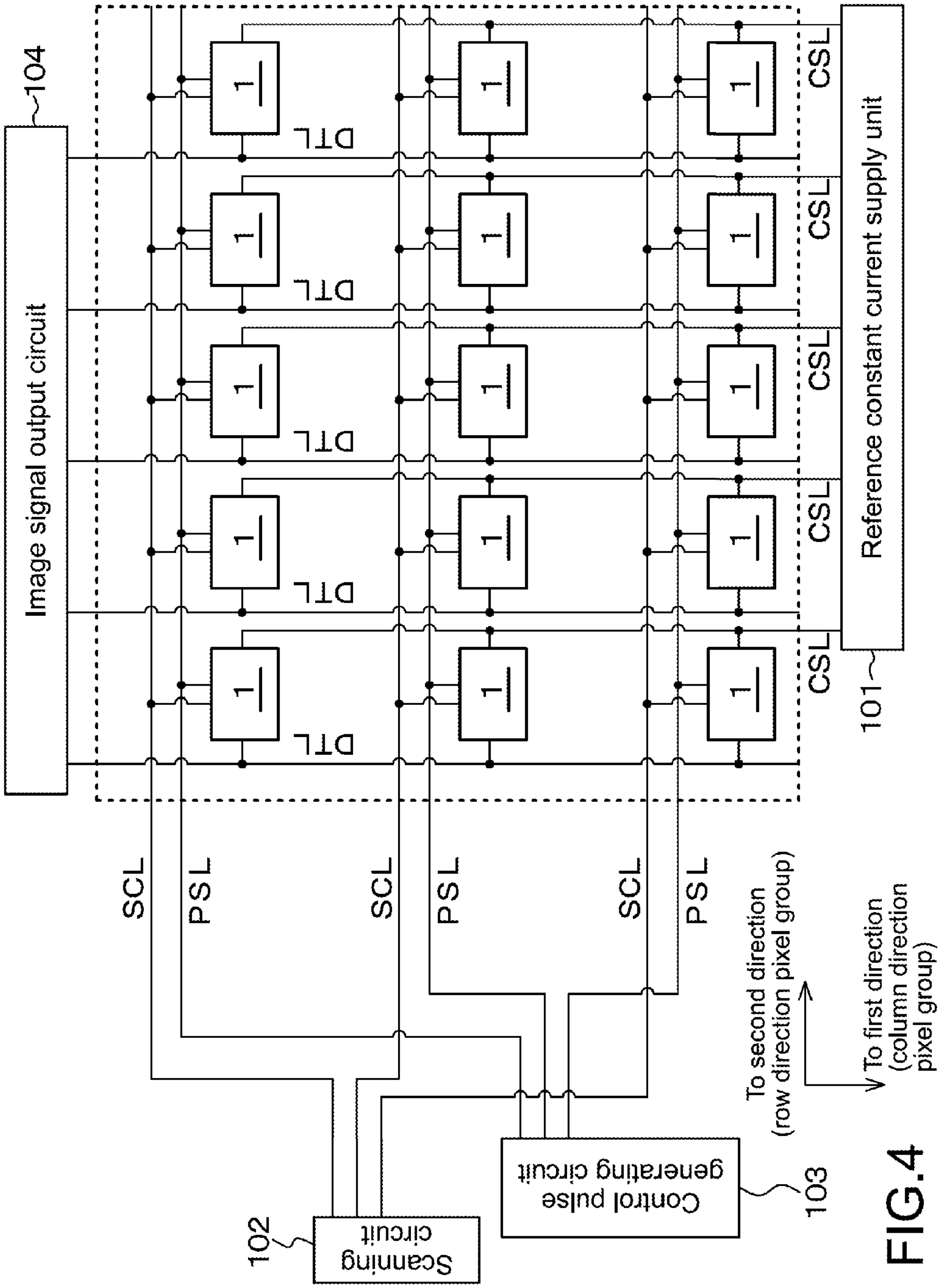
FIG. 4 is a conceptual diagram of a circuit constituting the display apparatus according to the example 1.

The example 1 relates to the display apparatus according the embodiment of the present disclosure. FIG. 1A is a conceptual diagram of a pixel and the like including a light emitting unit and a drive circuit in a display apparatus according to the example 1, and FIG. 1B is a circuit diagram of a comparator circuit constituting the drive circuit in the display apparatus according to the example 1. Moreover, FIG. 2 is a circuit diagram of a current source constituting the drive circuit in the display apparatus according to the example 1, and FIG. 3 is a circuit diagram of a current source according to a reference example. Furthermore, FIG. 4 is a conceptual diagram of a circuit constituting the display apparatus according to the example 1. It should be noted that in FIG. 4, only 3×5 pixels are shown in order to simplify the figure.

The display apparatus according to the example 1 includes a plurality of pixels (more specifically, sub-pixels; the same shall apply hereinafter) 1 arranged in a two-dimensional matrix pattern, each of the plurality of pixels including a light emitting unit 10 and a drive circuit 11 that drives the light emitting unit 10. Specifically, the plurality of pixels 1 are arranged in a first direction and a second direction in a matrix pattern. Then, a group of the pixels is divided into p pixel blocks along the first direction.

Each drive circuit 11 includes (a) a comparator circuit 12 that is connected to a control pulse line PSL and a data line DTL, compares a control pulse LCP having a voltage with a saw-tooth waveform, which is output from the control pulse line PSL, with a potential based on a signal voltage (emission intensity signal) $V_{sig}$ from the data line DTL, and outputs a predetermined voltage (referred to as a "first predetermined voltage" for the sake of convenience) based on the comparison result, (b) a current source 13 that supplies a drive current, e.g., constant current, to the light emitting unit 10, and (c) a transistor for driving a light emitting unit $TR_{Drv}$ that is operated by the first predetermined voltage output from the comparator circuit 12 and then supplies a current from the current source 13 to the light emitting unit 10 to drive the light emitting unit 10. It should be noted that the signal voltage $V_{Sig}$ is specifically a video signal voltage that controls the light emission (luminance) of pixels.

As shown in FIG. 1B, the comparator circuit 12 according to the example 1 includes, for example, a differential comparator circuit. Specifically, the comparator circuit 12 includes a comparing unit formed of a signal write transistor $TR_{Sig}$ to which the signal voltage (emission intensity signal) $V_{sig}$ is input, a capacity unit $C_0$ that is connected to the signal write transistor $TR_{Sig}$ and holds a potential based on the signal voltage $V_{Sig}$ on the basis of the operation of the signal write transistor $TR_{Sig}$, and a differential circuit 121 that inputs the potential based on the signal voltage $V_{Sig}$ held by the capacity unit $C_0$ and the control pulse LCP.

It should be noted that although a differential comparator circuit is exemplified as the comparator circuit 12 according to the example 1, the present disclosure is not limited thereto. As the comparator circuit 12 according to the example 1, in addition to the differential comparator circuit, various types of comparator circuits such as chopper type comparators can be used.

The signal write transistor $TR_{Sig}$ and the transistor for driving a light emitting unit $TR_{Drv}$ are each formed of an existing field effect transistor including a gate electrode, a channel forming area, and source and drain electrodes. The signal write transistor $TR_{Sig}$ includes, but not limited to, an re-channel type field effect transistor and the transistor for driving a light emitting unit $TR_{Drv}$ includes, but not limited to, a p-channel type field effect transistor.

The gate electrode of the signal write transistor $TR_{Sig}$ is connected to a scanning circuit 102 that is provided in the display apparatus through a scanning line SCL. Moreover, one of the source and drain electrodes in the signal write transistor $TR_{Sig}$ is connected to an image signal output circuit 104 provided in the display apparatus through the data line DTL. Furthermore, the other of the source and drain electrodes in the signal write transistor $TR_{Sig}$ is connected to an end of the capacity unit $C_0$. The other end of the capacity unit $C_0$ is connected to a power supply (ground GND in example 1) on a negative potential side.

Then, to the signal write transistor $TR_{Sig}$, the signal voltage (emission intensity signal) $V_{sig}$ is input from the image signal output circuit 104 through the data line DTL. The capacity unit $C_0$ holds the potential based on the signal voltage $V_{Sig}$ on the basis of the operation of the signal write transistor $TR_{Sig}$. The potential based on the signal voltage $V_{Sig}$ is input to an inverting (−) input terminal of the differential circuit 121. On the other hand, to a non-inverting (+) end of the differential circuit 121, the control pulse LCP having a voltage with a saw-tooth waveform is input.

The gate electrode of the transistor for driving a light emitting unit $TR_{Drv}$ is connected to an output unit of the differential circuit 121, which is an output unit (output end) of the comparator circuit 12. Moreover, one of the source and drain electrodes of the transistor for driving a light emitting unit $TR_{Drv}$ is connected to a power supply $V_{dd}$ on a positive potential side via the current source 13 and the other of the source and drain electrodes is connected to the light emitting unit 10. The light emitting unit 10 is formed of a light emitting diode.

To the current source 13, a constant current is supplied from a reference constant current supply unit 101 through a current supply line CSL. It should be noted that the reference constant current supply unit 101, the scanning circuit 102, a control pulse generating circuit 103, the image signal output circuit 104, and the like may be provided in the display apparatus or in the outside.

Next, the current source 13 according to the example 1 will be described. As shown in FIG. 2, the current source 13 according to the example 1 includes an inverter circuit 131, a differential amplifier 132, three p-channel type field effect transistors $TR_{11}$, $TR_{12}$, and $TR_{13}$, and a capacity unit $C_{11}$.

To the inverter circuit 131, a scanning signal is input from the scanning circuit 102 provided in the display apparatus through the scanning line SCL. In the differential amplifier 132, a voltage based on a desired constant current supplied from the reference constant current supply unit 101 through the current supply line CSL is input to the non-inverting (+) input terminal and a reference voltage $V_{Ref}$ is input to the inverting (−) input terminal.

Here, the reference voltage $V_{Ref}$ does not need to be set exactly as long as it is smaller than the potential obtained by subtracting a minimum voltage between the drain electrode and the source electrode when the field effect transistor $TR_{13}$ reaches the saturation area from the potential of the power supply $V_{dd}$ and is larger than the potential obtained by adding the both-end voltage generated by the current of the reference constant current supply unit 101 in the resistance of the current supply line CSL to a potential in which a terminal of the reference constant current supply unit 101 on a non-grounded side can cause a desired current to flow. The reason for this is as follows.

The assumption is made that the differential amplifier 132 is an ideal amplifier and an offset voltage can be ignored. If the drain voltage of the field effect transistor $TR_{12}$ is higher than the reference voltage $V_{Ref}$ in the interval in which the scanning signal is active, the output voltage of the differential amplifier 132 increases. Moreover, the gate voltage of the field effect transistor $TR_{13}$ is increased via the field effect transistor $TR_{11}$, and the source-drain current of the field effect transistor $TR_{13}$ is decreased. Accordingly, the drain voltage of the field effect transistor $TR_{12}$ decreases.

Moreover, if the drain voltage of the field effect transistor $TR_{12}$ is lower than the reference voltage $V_{Ref}$, the output voltage of the differential amplifier 132 decreases. The gate voltage of the field effect transistor $TR_{13}$ is decreased via the field effect transistor $TR_{11}$, and the source-drain current of the field effect transistor $TR_{13}$ is increased. Accordingly, the drain voltage of the field effect transistor $TR_{12}$ increases.

In this way, the drain voltage of the field effect transistor $TR_{12}$ converges to the reference voltage $V_{Ref}$, and is not changed. This represents that the source-drain current of the field effect transistor $TR_{13}$ has the same value as that of the current of the current source 101.

Specifically, the gate voltage of the field effect transistor $TR_{13}$ is adjusted by the differential amplifier 132 under the condition in which the source-drain current of the field effect transistor $TR_{13}$ has the same value as that of the current of the current source 101 in such a way that the voltage between the drain electrode and the source electrode of the field effect transistor $TR_{13}$ corresponds to the voltage obtained by subtracting the reference voltage $V_{Ref}$ from the potential of the power supply $V_{dd}$. Then, it is possible to perform a desired operation if the setting voltage of the reference voltage $V_{Ref}$ of the differential amplifier 132 is used in the above-mentioned voltage range. The above description is the reason why the reference voltage $V_{Ref}$ does not need to be set exactly.

The gate electrodes of the field effect transistors $TR_{11}$ and $TR_{12}$ are commonly connected to the output end of the inverter circuit 131. Therefore, a scanning signal (potential of the scanning line SCL) whose polarity is inverted in the inverter circuit 131 is input to the field effect transistors $TR_{11}$ and $TR_{12}$ In this way, the field effect transistors $TR_{11}$ and $TR_{12}$ turn on and off in synchronization with the scanning signal.

One of the source and drain electrodes of the field effect transistor $TR_{11}$ is connected to the gate electrode of the field effect transistor $TR_{13}$, and the other of the source and drain electrodes is connected to the output end of the differential amplifier 132. Moreover, one of the source and drain electrodes of the field effect transistor $TR_{12}$ is connected to one of the source and drain electrodes of the transistor for driving a light emitting unit $TR_{Drv}$, and the other of the source and drain electrodes of the field effect transistor $TR_{12}$ is connected to the current supply line CSL.

The field effect transistor $TR_{13}$ is a current source transistor (hereinafter, referred to as "current source transistor $TR_{13}$" in some cases), and the gate electrode of the field effect transistor $TR_{13}$ is connected to one of the source and drain electrodes of the field effect transistor $TR_{11}$. Further, one of the source and drain electrodes of the current source transistor $TR_{13}$ is connected to the power supply $V_{dd}$ on a positive potential side, and the other of the source and drain electrodes is connected to one of the source and drain electrodes of the transistor for driving a light emitting unit $TR_{Drv}$. One of the electrodes of the capacity unit $C_{11}$ is connected to the power supply $V_{dd}$ on a positive side, and the other of the electrodes is connected to one of the source and drain electrodes of the field effect transistor $TR_{11}$ and the gate electrode of the current source transistor $TR_{13}$.

The current source 13 according to example 1 having the above-mentioned configuration is a current write type constant current circuit. Then, the output of the differential amplifier 132 is supplied to the gate electrode of the current source transistor $TR_{13}$ via the field effect transistor $TR_{11}$ that turns on and off in synchronization with a scanning signal. It should be noted that a drive circuit using the current source 13 according to the example 1 has a configuration in which an n-channel type field effect transistor $TR_{00}$ is connected in parallel with the light emitting unit 10.

Meanwhile, the current source 13 constituting the drive circuits 11 of the pixels 1 needs to have the same current value for each color with little variation. Examples of a circuit with little variation of a current value include the current write type constant current circuit shown in FIG. 3. The current write type constant current circuit will be described as a current source 13' according to a reference example.

As shown in FIG. 3, the current source 13' according to the reference example includes the inverter circuit 131, three p-channel type field effect transistors $TR_{11}$, $TR_{12}$, and $TR_{13}$, and the capacity unit $C_{11}$.

To the inverter circuit 131, a scanning signal is input from the scanning circuit 102 provided in the display apparatus through the scanning line SCL. The field effect transistors $TR_{11}$ and $TR_{12}$ are connected to each other in series, and the gate electrodes thereof are commonly connected to the output end of the inverter circuit 131. Therefore, to the field effect transistors $TR_{11}$ and $TR_{12}$, the scanning signal (potential of the scanning line SCL) whose polarity is inverted is input.

The gate electrode of the current source transistor $TR_{13}$ is connected to one of the source and drain electrodes of the field effect transistor $TR_{11}$. Furthermore, one of the source and drain electrodes of the current source transistor $TR_{13}$ is connected to the power supply $V_{dd}$ on a positive potential side, and the other of the source and drain electrodes is connected to one of the source and drain electrodes of the transistor for driving a light emitting unit $TR_{Drv}$. One of the electrodes of the capacity unit $C_{11}$ is connected to the power supply $V_{dd}$ on a positive potential side, and the other of the electrodes is connected to one of the source and drain electrodes of the field effect transistor $TR_{11}$ and the gate electrode of the current source transistor $TR_{13}$.

The common connection node of the field effect transistors $TR_{11}$ and $TR_{12}$, i.e., the other of the source and drain electrodes of the field effect transistor $TR_{11}$ and one of the source and drain electrodes of the field effect transistor $TR_{12}$, is connected to the other of the source and drain electrodes of the current source transistor $TR_{13}$.

The current source 13' that has such a configuration and is formed of a current write type constant current circuit has been described as a reference example. To the input terminal of the current source 13' according to the reference example, more specifically, the other of the source and drain electrodes of the field effect transistor $TR_{12}$, a desired constant current $I_{Ref}$ is supplied from the reference constant current supply unit 101 through the current supply line CSL.

The circuit operation of the current source 13' according to the reference example is as follows. Specifically, when the scanning signal (potential of the scanning line SCL) is at a high level, the field effect transistors $TR_{11}$ and $TR_{12}$ are turned on. As a result, the reference constant current $I_{Ref}$ of the reference constant current supply unit 101 flows through the current source transistor $TR_{13}$ via the field effect transistors $TR_{11}$ and $TR_{12}$. At that time, the both-end voltage of the capacity unit $C_{11}$ is a voltage for causing the same current as that of the reference constant current supply unit 101 to flow through the current source transistor $TR_{13}$.

In the interval in which the scanning signal is at a low level, the capacity unit $C_{11}$ is cut off by the turning off of the field effect transistor $TR_{11}$, and holds the voltage for causing the same current as that of the reference constant current supply unit 101 to flow through the current source transistor $TR_{13}$. Then, when the output of the comparator $circuit_{12}$ is at a first predetermined voltage (L), the current source transistor $TR_{13}$ causes the same current as that of the reference constant current supply unit 101 to flow through the light emitting unit 10 on the basis of the holding voltage of the capacity unit $C_{11}$.

As described above, the current source 13' according to the reference example holds, in the capacity unit $C_{11}$, the voltage for causing the same current as that of the reference constant current supply unit 101 to flow through the current source transistor $TR_{13}$, and operates, based on the holding voltage, to cause the same current as that of the reference constant current supply unit 101 to flow through the light emitting unit 10. Therefore, it has an advantage in that there is no need to consider the variation in characteristics of the pixels of the current source transistor $TR_{13}$. The same holds true for the current source 13 according to the example 1.

Meanwhile, in order to configure the display apparatus by using a current write type current source, it is most efficient to arrange the reference constant current supply unit (reference constant current source) 101 for each color per one vertical line (pixel column) and connect all pixels in the vertical line to the reference constant current source 101. In this case, depending on the position of the pixel, the reference constant current supply unit 101 is connected to the pixel circuit through a significantly long wiring (current supply line CSL). Specifically, to the current source 13 of each pixel, the reference constant current $I_{Ref}$ is supplied from the reference constant current supply unit 101 through the current supply line CSL provided for each vertical line (pixel column). Therefore, as shown in FIG. 3, a wiring resistance R of the current supply line CSL and a capacity C are connected to the capacity unit $C_{11}$, actually. The capacity value of the capacity unit $C_{11}$ is normally is smaller than that of the capacity C.

On the other hand, the scanning signal becomes active after a short lag period of time from an adjacent horizontal line becomes non-active, in order to prevent horizontal lines (pixel rows) from being crossed. During the lag period of time, the potential of the wiring (current supply line CSL) is slightly reduced due to the current flown from the reference constant current supply unit 101. The slightly reduced potential of the wiring has to be increased in the interval in which the scanning signal is active until the current source transistor $TR_{13}$ has the same potential as the potential of the reference constant current $I_{Ref}$ of the reference constant current supply unit 101.

However, the only current value that charges the capacity C of the current supply line CSL and the capacity unit $C_{11}$ and changes the potential of the wiring is a current value of the difference between the capacity C and the capacity unit $C_{11}$, and is decreased as the current of the current source transistor $TR_{13}$ approaches the reference constant current $I_{Ref}$ of the reference constant current supply unit 101. As a result, it takes a long time for the voltage of the capacity unit $C_{11}$ to reach a desired voltage (which is a so-called settling problem), and the voltage of the capacity unit $C_{11}$ may not reach the desired voltage in the interval in which the scanning signal is active. Then, if the voltage of the capacity unit $C_{11}$ does not reach the desired voltage, it may be impossible to perform writing at a constant current virtually. Therefore, the current value of the current source transistor $TR_{13}$ is dispersed.

On the other hand, in the current source 13 according to the example 1, the differential amplifier 132 controls the gate potential of the current source transistor $TR_{13}$ in the interval in which the scanning signal is active. Specifically, the field effect transistor $TR_{11}$ is turned on in the interval in which the scanning signal is active. Then, in the case where the potential of the wiring (current supply line CSL) is lower than the reference voltage $V_{Ref}$ in the interval in which the scanning signal is active, the differential amplifier 132 quickly controls the field effect transistor $TR_{12}$ to increase the potential of the wiring (the current supply line CSL) depending on the current flown through the current source transistor $TR_{13}$ by reducing the gate potential of the current source transistor $TR_{13}$. Accordingly, it is possible to reduce the period of time for the voltage of the capacity unit $C_{11}$ to reach (converge to) the desired voltage. That is, it is possible to solve the settling problem of taking a lot of time for the gate potential of the current source transistor $TR_{13}$ to converge. Then, it is possible to align the current of the current source transistor $TR_{13}$ with the reference constant current $I_{Ref}$ of the reference constant current supply unit 101.

Figure 5:
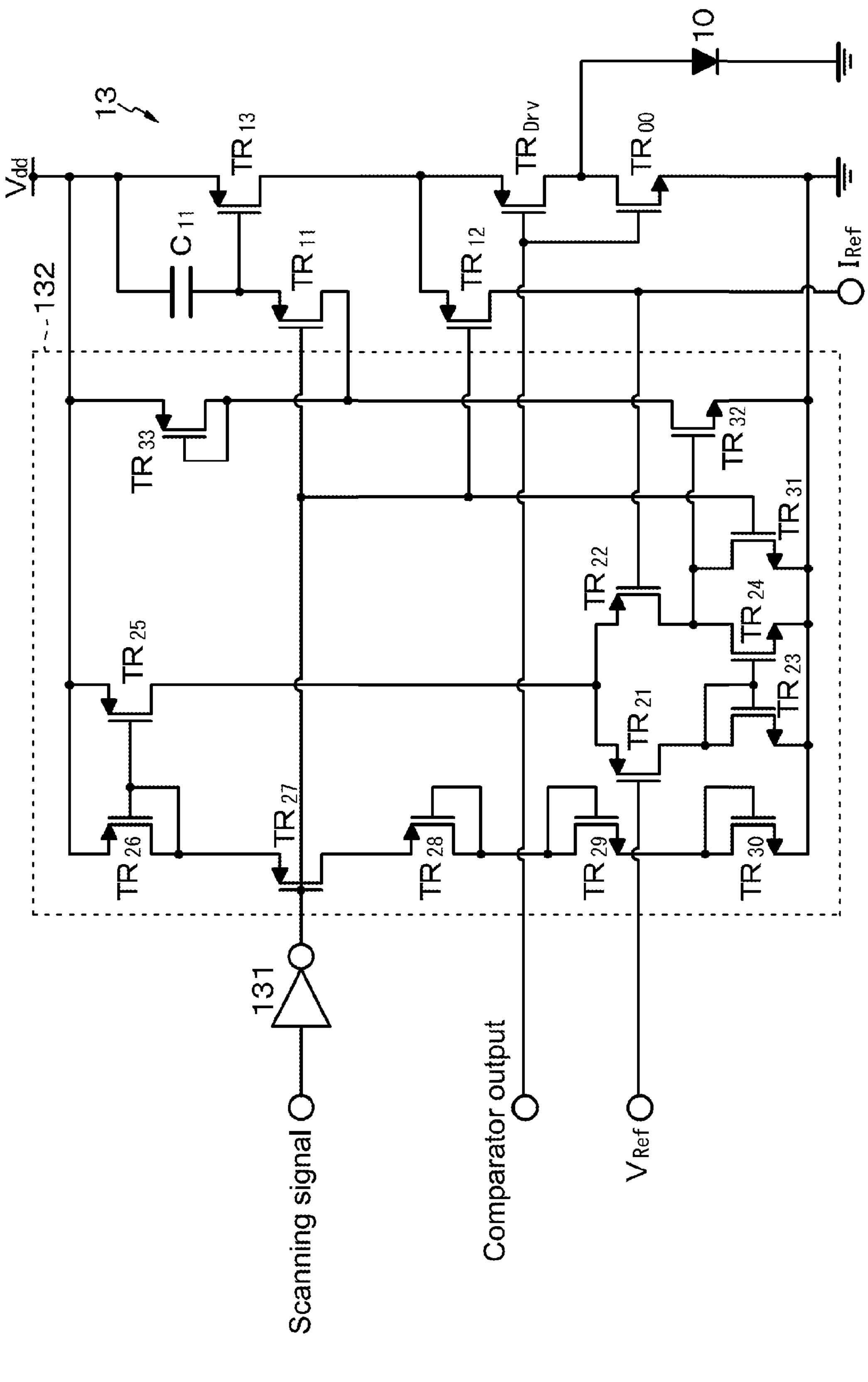
FIG. 5 is a circuit diagram showing an example of the specific circuit configuration of the current source according to the example 1.

FIG. 5 is a circuit diagram showing an example of the specific circuit configuration of the current source according to the example 1. The differential amplifier 132 is configured by a field effect transistor as follows, for example. P-channel type field effect transistors $TR_{21}$ and $TR_{22}$ are each a differential pair transistor (hereinafter, referred to as "differential pair transistors $TR_{21}$ and $TR_{22}$" in some cases), and constitutes a differential circuit to which a source electrode is commonly connected. Then, the gate input of the differential pair transistor $TR_{21}$ is the reference voltage $V_{Ref}$, and the gate input of the differential pair transistor $TR_{22}$ is the potential of the wiring (current supply line CSL).

N-channel type field effect transistors $TR_{23}$ and $TR_{24}$ constitute a current mirror circuit having the active load of the differential circuit. The drain electrode and the gate electrode of the field effect transistor $TR_{23}$ are connected to the drain electrode of the differential pair transistor $TR_{21}$ and the source electrode of the field effect transistor $TR_{23}$ is connected to the power supply GND on a low potential side. The gate electrode of the field effect transistor $TR_{24}$ is connected to the gate electrode of the field effect transistor $TR_{23}$, the drain electrode of the field effect transistor $TR_{24}$ is connected to the drain electrode of the differential pair transistor $TR_{22}$, and the source electrode of the field effect transistor $TR_{24}$ is connected to the power supply GND on a low potential side.

A p-channel type field effect transistor $TR_{25}$ is a constant current source transistor that supplies a constant current to the differential circuit (hereinafter, referred to as "constant current source transistor $TR_{25}$" in some cases), and is connected between the source common connection node of the differential pair transistors $TR_{21}$ and $TR_{22}$ and the power supply $V_{dd}$ on a positive potential side. To the gate electrode of the constant current source transistor $TR_{25}$, a predetermined voltage generated by a constant voltage circuit formed of p-channel type field effect transistors $TR_{26}$, $TR_{27}$, and $TR_{28}$, and n-channel type field effect transistors $TR_{29}$ and $TR_{30}$ is applied.

In the above-mentioned constant voltage circuit, the p-channel type field effect transistors $TR_{26}$, $TR_{27}$, and $TR_{28}$ and the n-channel type field effect transistors $TR_{29}$ and $TR_{30}$ are connected in series between the power supply $V_{dd}$ on a positive potential side and the power supply GND on a low potential side. The gate electrode of the field effect transistor $TR_{26}$ is connected to the gate electrode of the constant current source transistor $TR_{25}$. The field effect transistor $TR_{27}$ uses the scanning signal inverted in the inverter circuit 131 as the gate input. Accordingly, the field effect transistor $TR_{27}$ is turned on in the interval in which the scanning signal is active, and thus the constant voltage circuit is operated. The field effect transistors $TR_{26}$, $TR_{28}$, $TR_{29}$, and $TR_{30}$ each has a diode connection configuration in which the gate electrode and drain electrode thereof are commonly connected to each other.

The output node of the above-mentioned differential circuit is a drain common connection node of the differential pair transistor $TR_{22}$ and the field effect transistor $TR_{24}$. Then, between the output node and the power supply GND on a low potential side, an n-channel type field effect transistor $TR_{31}$ is connected. The field effect transistor $TR_{31}$ uses the scanning signal inverted in the inverter circuit 131 as the gate input, and is turned on in the interval in which the scanning signal is not active and is turned off in the interval in which the scanning signal is active. To the output node of the differential circuit, the gate electrode of an n-channel type field effect transistor $TR_{32}$ constituting a source grounded circuit is connected. Then, the drain electrode of the field effect transistor $TR_{32}$ is the output node of the differential amplifier 132. Between the output node and the power supply $V_{dd}$ on a positive potential side, a p-channel type field effect transistor $TR_{33}$ having a diode connection configuration is connected.

Example 2

Figure 6:
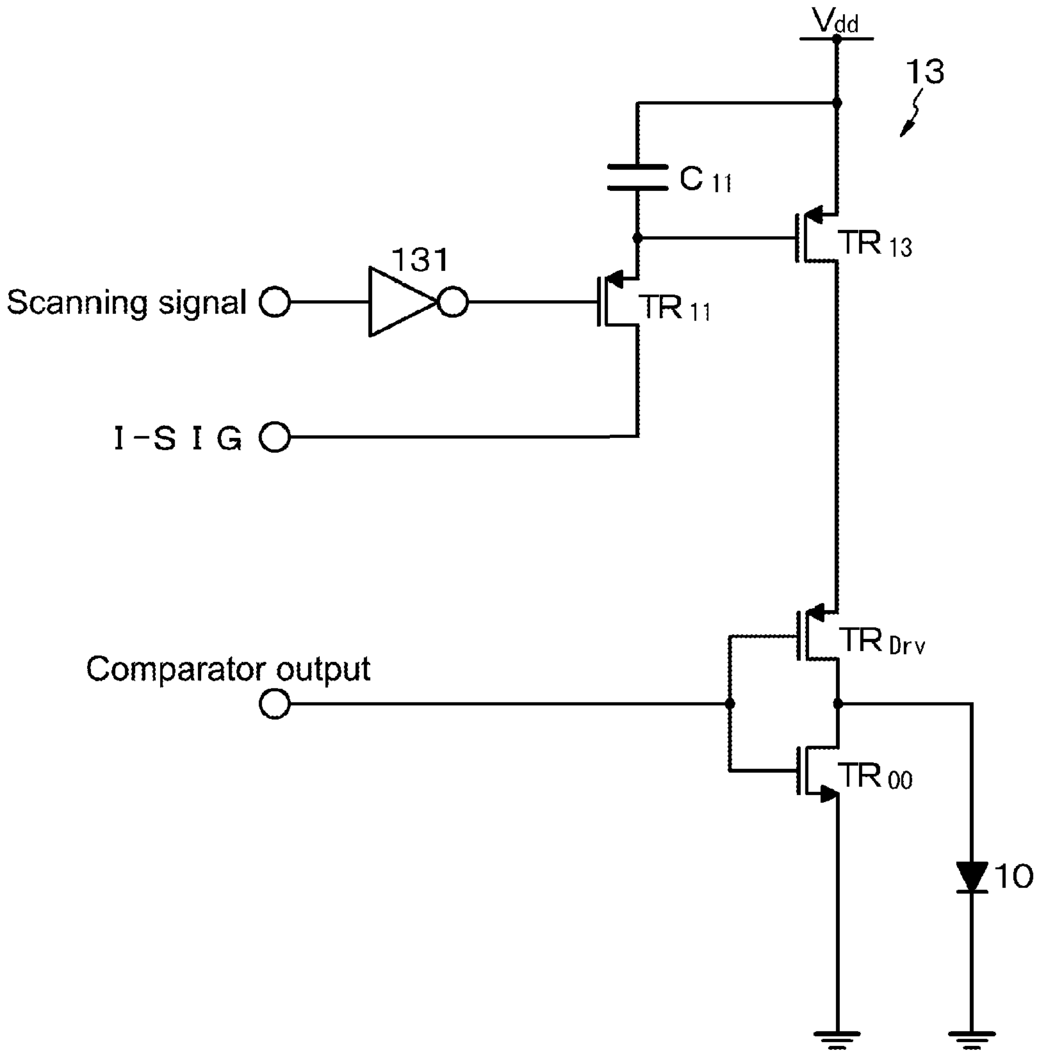
FIG. 6 is a circuit diagram of a current source including a voltage write type constant current circuit, which constitutes a drive circuit in a display apparatus according to an example 2.
Figure 7:
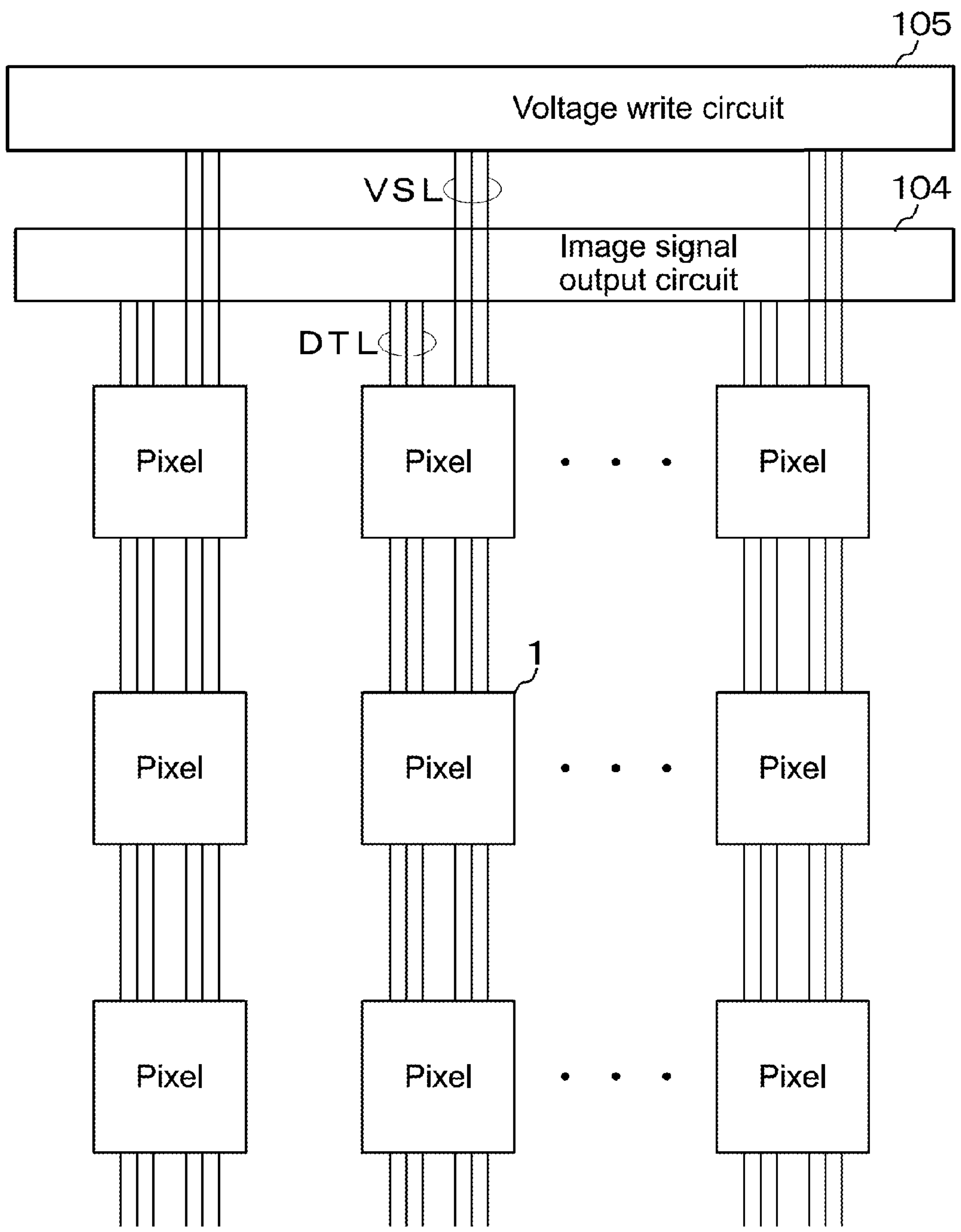
FIG. 7 is a conceptual diagram of a circuit constituting the display apparatus according to the example 2.

An example 2 is a modified example of the example 1. FIG. 6 is a circuit diagram of a current source constituting a drive circuit in a display apparatus according to the example 2, and FIG. 7 is a conceptual diagram of a circuit constituting the display apparatus according to the example 2.

The above-mentioned current write type constant current circuit has a problem of the convergence of the write voltage for the gate electrode of the current source transistor $TR_{13}$ (settling problem), and it is difficult to perform the writing in a very short period of time. Moreover, because the current source 13 according to the example 1 has many elements constituting the differential amplifier 132, it has a disadvantage in terms of the circuit area.

On the other hand, the example 2 employs a configuration in which a voltage set for each pixel is directly written (applied) to the gate electrode of the current source transistor $TR_{13}$. Then, with the configuration, it is possible to solve the problem of the convergence of the write voltage for the gate electrode of the current source transistor $TR_{13}$ (settling problem). Specifically, in the example 2, a voltage write type constant current circuit whose circuit diagram is shown in FIG. 6 is used as the current source 13 constituting the drive circuit 11.

Meanwhile, in the voltage write type constant current circuit, the value of the current flown through the current source transistor $TR_{13}$ may be dispersed due to the variation in characteristics of each pixel of the current source transistor $TR_{13}$ even if the same voltage is written to the current source transistor $TR_{13}$ in each pixel. In this regard, as shown in FIG. 7, the display apparatus according to the example 2 includes a voltage write circuit 105, and a respective voltage value is directly written to each pixel of the gate electrode of the current source transistor $TR_{13}$ from the voltage write circuit 105 through a voltage supply line VSL provided for each pixel column.

The light emitting diodes serving as the light emitting unit 10 of each pixel 1 have normally different characteristics. The variation in characteristics of the light emitting diode is visually confirmed as display unevenness of a screen. In this regard, in consideration of the variation in characteristics of the light emitting diode and the variation in characteristics of the current source transistor $TR_{13}$ for each pixel in advance, a voltage values for correcting the variations is set and is stored in the voltage write circuit 105. Then, the voltage value set for each pixel separately in consideration of the variation in characteristics of the light emitting diode and the variation in characteristics of the current source transistor $TR_{13}$ for each pixel is directly written to the gate electrode of the current source transistor $TR_{13}$ pixel row by pixel row from the voltage write circuit 105 through the voltage supply line VSL.

As described above, with a system configuration in which a voltage value is written for each pixel separately in consideration of the variation in characteristics of the current source transistor $TR_{13}$ and the variation in characteristics of the light emitting diode, it is possible to correct the variation in characteristics of each pixel of the current source transistor $TR_{13}$ and to correct the variation in characteristics of each pixel of the light emitting diode. That is, because the value of the current flown through the current source transistor $TR_{13}$ can be fine-adjusted for each pixel by writing a voltage value set for each pixel separately to the pixel, particularly, it is possible to attain a display apparatus that is capable of correcting display unevenness of a screen caused due to the variation in characteristics of the light emitting diode.

Example 3

Figure 8:
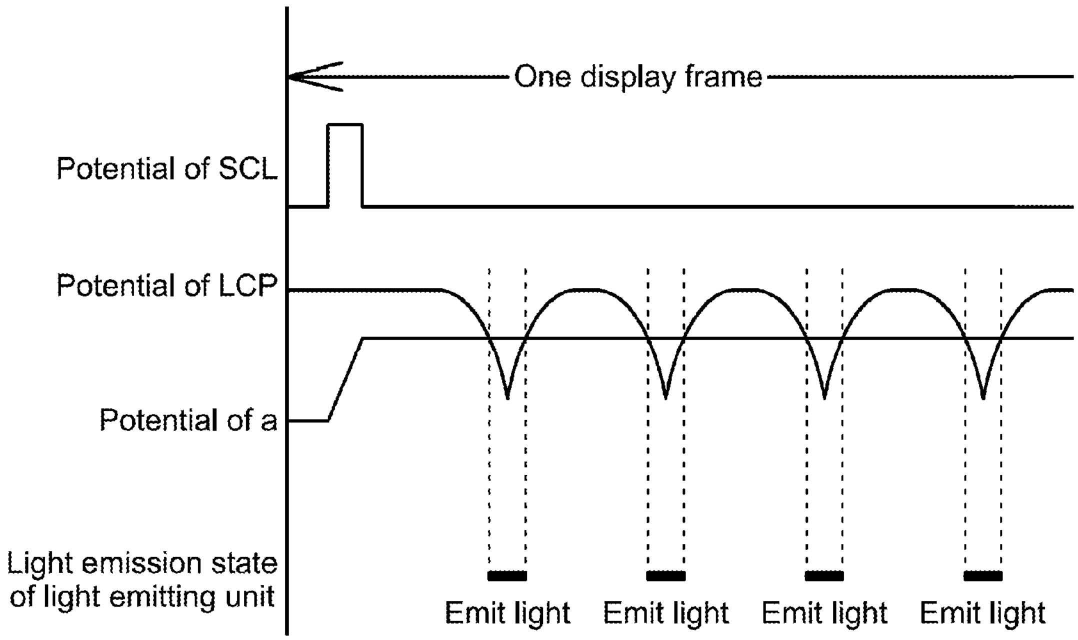
FIG. 8 is a schematic diagram showing a control pulse and the like for explaining the operation of one pixel in a display apparatus according to an example 3.
Figure 9:
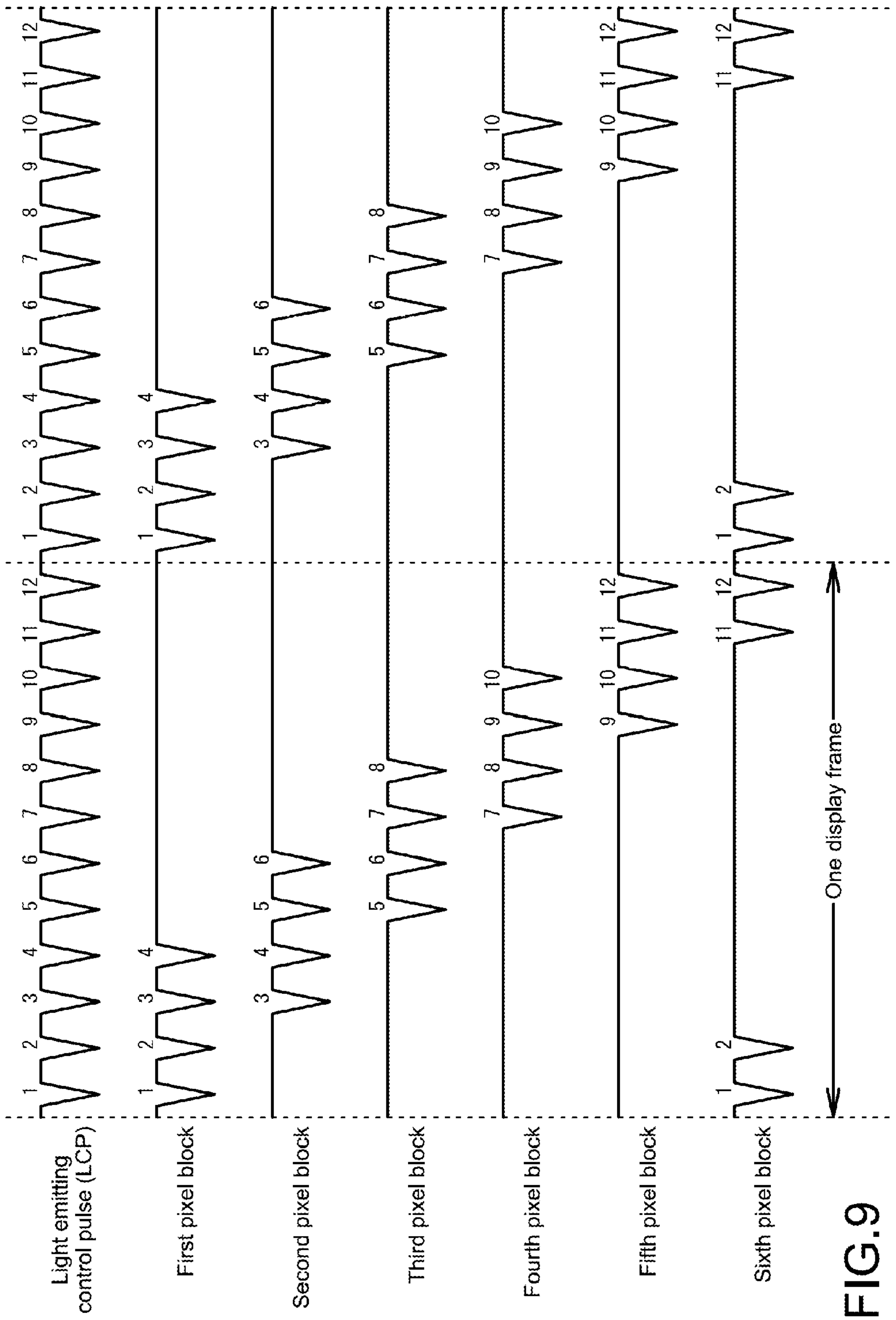
FIG. 9 is a diagram schematically showing supply of a plurality of control pulses to a pixel block in the display apparatus according to the example 3.
Figure 11:
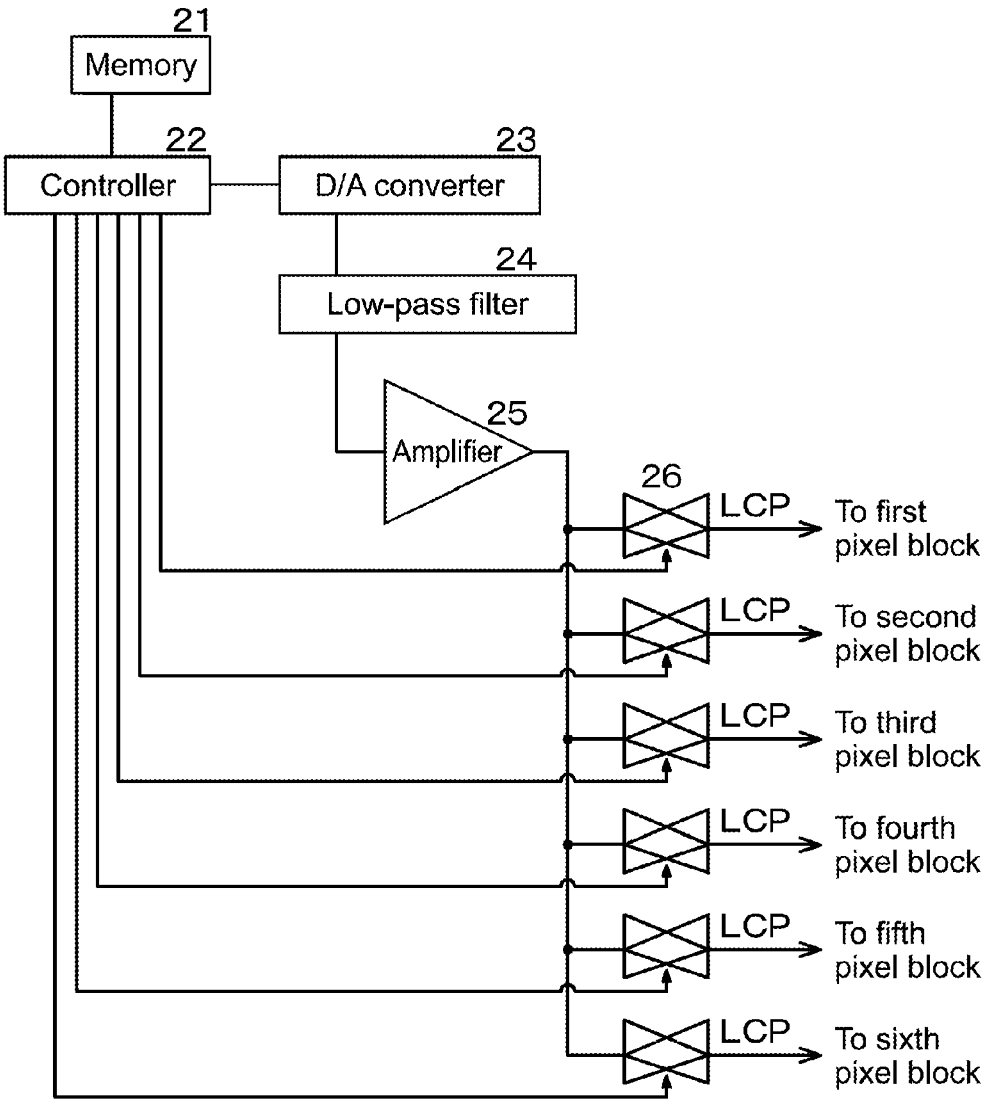
FIG. 11 is a conceptual diagram of a control pulse generating circuit in a display apparatus according to an embodiment of the present disclosure.

An example 3 is a modified example of the example 1 or the example 2. FIG. 8 is a schematic diagram showing a control pulse and the like for explaining the operation of one pixel in a display apparatus according to the example 3. Moreover, FIG. 9 is a diagram schematically showing supply of a plurality of control pulses to a pixel block in the display apparatus according to the example 3. Furthermore, FIG. 11 is a conceptual diagram of a control pulse generating circuit in the display apparatus according to the embodiment of the present disclosure.

It should be noted that in FIG. 9 and FIG. 10 to be described later, the saw-tooth waveform of the control pulse is shown as a triangular shape for the sake of convenience.

The display apparatus according to the example 3 includes the plurality of pixels 1 arranged in the first direction and the second direction in a two-dimensional matrix pattern, each of the plurality of pixels 1 including the light emitting unit 10 and the drive circuit 11 that drives the light emitting unit 10, and a group of the pixels is divided into p pixel blocks along the first direction. Then, the light emitting units 10 of each pixel block are caused to simultaneously emit light sequentially from the light emitting units 10 constituting pixels 1 of a first pixel block to the light emitting units 10 constituting pixels 1 of a p-th pixel block and, when the light emitting units 10 constituting pixels 1 of one pixel block are caused to emit light, the light emitting units 10 constituting pixels 1 of the other pixel blocks are not caused to emit light.

For example, a full HD full color display apparatus having the number of pixels of the screen thereof in the horizontal direction (second direction) is 1920 and the number of pixels of the screen in the vertical direction (first direction) is 1080 is assumed. Although the group of pixels is divided into p pixel blocks along the first direction, p is 6, for example. In this case, the first pixel block includes first to one hundred eightieth pixel groups, the second pixel block includes one hundred eighty first to three hundred sixtieth pixel groups, the third pixel block includes three hundred sixty first to five hundred fortieth pixel groups, the fourth pixel block includes five hundred forty first to seven hundred twentieth pixel groups, the fifth pixel block includes seven hundred twenty first to nine hundredth pixel groups, and the sixth pixel block includes nine hundred first to one thousand eightieth pixel blocks.

Hereinafter, the operation of each pixel in the first pixel block will be described.

(Signal Voltage Writing Period of Time)

As described in the example 1, in the capacity unit $C_0$, the potential of the data line DTL, i.e., charges corresponding to the potential based on the signal voltage $V_{Sig}$ are accumulated. In other words, the capacity unit $C_0$ holds the potential based on the signal voltage. Here, the assumption is made that the drive circuits 11 (specifically, the signal write transistors $TR_{Sig}$) in all pixels of one column arranged in the second direction (row direction pixel group) are caused to operate simultaneously in the first pixel block. Then, the simultaneous operation of the drive circuits 11 (specifically, the signal write transistors $TR_{Sig}$) in all pixels of one column arranged in the second direction (row direction pixel group) in the first pixel block is performed sequentially from the drive circuits 11 (specifically, the signal write transistors $TR_{Sig}$) in all pixels of the first column arranged in the first direction (first row direction pixel group) to the drive circuits 11 (specifically, the signal write transistors $TR_{Sig}$) in all pixels of the last (specifically, one hundred eightieth) column arranged in the first direction (last row direction pixel group).

(Pixel Block Light Emitting Period of Time)

When the above-mentioned operation is completed in the first pixel block, the control pulse LCP is supplied from the control pulse generating circuit 103 to the first pixel block. Specifically, the drive circuits 11 (specifically, the transistor for driving a light emitting unit $TR_{Drv}$) constituting all pixels 1 in the first pixel block operate simultaneously, and the light emitting units 10 in the all pixels 1 in the first pixel block are cause to emit light. The absolute value of the voltage of the control pulse LCP increases and then decreases as time passes. It should be noted that in the example shown in FIG. 8, the voltage of the control pulse LCP decreases and then increases as time passes. Then, gamma correction is performed with the voltage of the control pulse LCP that changes as time passes. Specifically, the absolute value of the change rate (differential value) of the voltage of the control pulse LCP with time being a variable is proportional to the constant 2.2.

In the example shown in FIG. 8, the voltage of the control pulse LCP is, for example, 3 volt or more in the signal voltage writing period of time. Therefore, in the signal voltage writing period of time, because the comparator circuit 12 outputs a second predetermined voltage (H) from an output unit, the transistor for driving a light emitting unit $TR_{Drv}$ is in a turned-off state. In the pixel block light emitting period of time, the comparator circuit 12 outputs a first predetermined voltage (L) from the output unit when the voltage of the control pulse LCP starts to decrease and the voltage having a saw-tooth waveform of the control pulse LCP is equal to or smaller than the potential based on the signal voltage $V_{Sig}$. As a result, the transistor for driving a light emitting unit $TR_{Drv}$ is turned on, a current is supplied from the current supply line CSL to the light emitting unit 10, and thus the light emitting unit 10 emits light. The voltage of the control pulse LCP decreases to about 1 volt and then increases. Then, when the voltage having a saw-tooth waveform of the control pulse LCP exceeds the potential based on the signal voltage $V_{Sig}$, the comparator circuit 12 outputs the second predetermined voltage (H) from the output unit. As a result, the transistor for driving a light emitting unit $TR_{Drv}$ is turned off, supply of a current from the current supply line CSL to the light emitting unit 10 is blocked, and the light emitting unit 10 stops emitting light. Specifically, only in the period of time in which the potential based on the signal voltage (emission intensity signal) $V_{sig}$ exceeds the voltage having a saw-tooth waveform of the control pulse LCP, it is possible to cause the light emitting unit 10 to emit light. Then, the luminance of the light emitting unit 10 at this time depends on the period of time of the exceeding.

Specifically, the period of time for the light emitting unit 10 to emit light is based on the potential held by the capacity unit $C_0$ and the voltage of the control pulse LCP from the control pulse generating circuit 103. Then, gamma correction is performed with the voltage having a saw-tooth waveform of the control pulse LCP, which changes as time passes. Specifically, since the absolute value of the change rate in voltage of the control pulse LCP with time being a variable is proportional to the constant 2.2, there is no need to provide a circuit for performing gamma correction. For example, a method of using the control pulse with the voltage having a linear saw-tooth waveform (triangle waveform) to change the signal voltage $V_{Sig}$ with 2.2th power of the linear luminance signal is conceivable. However, the method is not effective because the change in voltage at low luminance is too small actually and the number of bits needs to be large particularly in order to achieve such a change in voltage by digital processing.

In the example 3, one control pulse generating circuit 103 is provided. As schematically shown in FIG. 8, the change in voltage of the control pulse LCP is very large at the low gradation part (low voltage part) and is likely to occur in response particularly to the waveform quality of the control pulse waveform at the part. Therefore, there is a need to consider the variation of the control pulse LCP generated in the control pulse generating circuit 103. On the other hand, because the display apparatus according to the example 3 includes only one control pulse generating circuit 103, the control pulse LCP generated in the control pulse generating circuit 103 causes substantially no variation. Specifically, because it is possible to cause the entire display apparatus to emit light by the same control pulse waveform, it is possible to prevent the variation in light emission from occurring. Moreover, since the absolute value of the voltage of the control pulse LCP increases and then decreases as time passes, it is possible to cause the light emitting units constituting all pixels (more specifically, all sub-pixels) in one pixel block to emit light at the same timing. That is, it is possible to align (match) the temporal centers of gravity of light emission of the light emitting units constituting the pixels in each pixel block with each other. Therefore, it is possible to reliably prevent vertical lines on the image due to the delay of light emission in the column direction pixel group from occurring.

In the display apparatus according to the example 3, the light emitting unit 10 emits light a plurality of times on the basis of the plurality of control pulses LCP. Alternatively, the light emitting unit 10 emits light a plurality of times on the basis of the plurality of control pulses LCP having a voltage with a saw-tooth waveform, which is supplied to the drive circuit 11, and the potential based on the signal voltage $V_{Sig}$. Alternatively, in the control pulse generating circuit 103, the light emitting unit 10 is caused to emit light a plurality of times on the basis of the plurality of control pulses LCP. The time interval of the plurality of control pulses LCP is constant. Specifically, in the example 3, in the pixel block light emitting period of time, four control pulses LCP are transmitted to the all pixels 1 constituting each pixel block and each pixel 1 emits light four times.

As schematically shown in FIG. 9, in the display apparatus according to the example 3, 12 control pulses LCP are supplied to 6 pixel blocks in one display frame. Then, the number of control pulses LCP in one display frame is larger than the number of control pulses LCP supplied to the drive circuit 11 in one display frame. Alternatively, in the control pulse generating circuit 103, the number of control pulses LCP in one display frame is larger than the number of control pulses LCP supplied to the drive circuit 11 in one display frame. Specifically, in the example shown in FIG. 9, the number of control pulses LCP in one display frame is 12 and the number of control pulses LCP supplied to the drive circuit 11 in one display frame is 4. In adjacent pixel blocks, two control pulses LCP are overlaid one on the other. Specifically, two adjacent pixel blocks are in light emission state simultaneously. Moreover, the first pixel block and the last pixel block are in light emission state simultaneously. Such a form can be achieved by generating a series of a plurality of control pulses LCP in one display frame, masking a part of the series of a plurality of control pulses LCP, and supplying no control pulse LCP to the drive circuits 11 constituting the pixels 1 in one pixel group when the light emitting units 10 constituting the pixels 1 in the one pixel group are not caused to emit light. Specifically, it only needs to use, for example, a multiplexer to take out a part of the series of control pules LCP (4 consecutive control pulses LCP) in one display frame and to supply it to the drive circuit 11.

Specifically, the control pulse generating circuit 103 according to the example 3 is a control pulse generating circuit that generates the control pulse LCP having a voltage with a saw-tooth waveform for controlling the drive circuit 11 in the display apparatus including a plurality of pixels 1 arranged in the first direction and the second direction in a two-dimensional matrix pattern, each of the plurality of pixels 1 including the light emitting unit 10 and the drive circuit 11 that causes the light emitting unit 10 to emit light for only the period of time depending on the potential based on the signal voltage $V_{Sig}$, in which a group of the plurality of pixels is divided into p pixel blocks along the first direction. Then, the control pulse generating circuit 103 supplies the control pulses LCP simultaneously to the light emitting units of each pixel block sequentially from drive circuits 11 constituting pixels 1 of a first pixel block to drive circuits 11 constituting pixels 1 of a p-th pixel block and, when supplying the control pulses LCP to the light emitting units constituting pixels 1 of one pixel block, supplies no control pulse LCP to the light emitting units constituting pixels 1 of the other pixel blocks. Here, in the control pulse generating circuit 103, a series of a plurality of control pulses LCP are generated in one display frame, and, when the light emitting units 10 constituting the pixels 1 in one pixel block is not caused to emit light, a part of the series of a plurality of control pulses LCP is masked and the drive circuits 11 constituting the pixels 1 in the one pixel block are supplied with no control pulse LCP.

More specifically, as shown in the conceptual diagram of FIG. 11, in the control pulse generating circuit 103, the waveform signal data of the control pulse stored in a memory 21 is read by a controller 22, the read waveform signal data is transmitted to a D/A converter 23, the data is converted into a voltage in the D/A converter 23, and the voltage is integrated by a low-pass filter 24, thereby generating a control pulse having a 2.2th power curve. Then, the control pulse is distributed to a plurality of (6 in the example 3) multiplexers 26 via an amplifier 25, only a part of the series of a plurality of control pules LCP, which is a necessary part, passes the multiplexer 26 under the control of the controller 22, and the other parts are masked, thereby generating a desired control pulse group (specifically, 6 control pulse groups of four consecutive control pulses LCP). It should be noted that because only one saw-tooth waveform is used as a source, it is possible to reliably prevent the variation in the generation of the control pulse LCP in the control pulse generating circuit 103 from occurring.

Then, the operation in the signal voltage writing period of time and the pixel block light emitting period of time descried above is sequentially performed from the first pixel block to the sixth pixel block. Specifically, as shown in FIG. 9, the light emitting units 10 are caused to emit light simultaneously for each pixel block, sequentially from the light emitting units 10 constituting the pixels 1 in the first pixel block to the light emitting units 10 constituting the pixels 1 in the p-th pixel block. When the light emitting units 10 constituting the pixels 1 of a part of the pixel blocks are caused to emit light, the light emitting units 10 constituting the pixels 1 of the other pixel blocks are not caused to emit light. It should be noted that at least any one of the pixel blocks are caused to emit light in one display frame.

Meanwhile, an existing driving method in which a video signal voltage is written to all pixels in a state where light emission of the pixels is stopped in a first period of time of one display frame, and the light emitting units of the pixels are caused to emit light in at least one period of time of light emission determined by the video signal voltage written to each pixel in a second period of time of the one display frame subsequent to the first period of time causes the following problem. Specifically, the video signal is often transmitted equally over the period of time of one display frame. Therefore, in a television receiving system, if the vertical blanking interval is applied to the second period of time, a method of causing all pixels to emit light simultaneously is conceivable. However, the vertical blanking interval normally has a duration of about 4% of one display frame. Therefore, the display apparatus has very low light emission efficiency. Moreover, in order to write the video signal transmitted over the period of time of one display frame to all pixels in the first period of time, there is a need to prepare a large signal buffer. Then, in order to transmit the video signal to each pixel at a speed higher than the transmission rate of the video signal, there is a need to prepare a creative signal transmission circuit. Furthermore, because all pixels are caused to emit light simultaneously in the second period of time, the electric power necessary for light emission is concentrated in a short period of time, which causes a problem that makes it difficult to design a power supply.

On the other hand, in the example 3, because, when the light emitting units constituting the pixels of a part of the pixel blocks (e.g., first and second pixel blocks) are caused to emit light, the light emitting units constituting the pixels of the other pixel blocks (e.g., third to sixth pixel blocks) are not caused to emit light, it is possible to prolong the period of time of light emission in the driving of the display apparatus based on the PWM driving method, and to improve the light emission efficiency. Further, because there is no need to write the video signal transmitted over the period of time of one display frame to all pixels in a certain period of time, i.e., it only needs to sequentially write the video signal transmitted in the period of time of one display frame for each row direction pixel group as in the existing display apparatus, there is no need to prepare a large signal buffer and to prepare a creative signal transmission circuit for transmitting the video signal to each pixel at a speed higher than the transmission rate of the video signal. Furthermore, because all pixels are not caused to emit light simultaneously in the period of time of light emission of pixels, i.e., when the light emitting units constituting the pixels of the first and second pixel blocks, for example, are caused to emit light, the light emitting units constituting the pixels in the third to sixth pixel blocks are not caused to emit light, the electric power necessary for light emission is not concentrated in a short period of time, which makes it easy to design a power supply.

Figure 10:
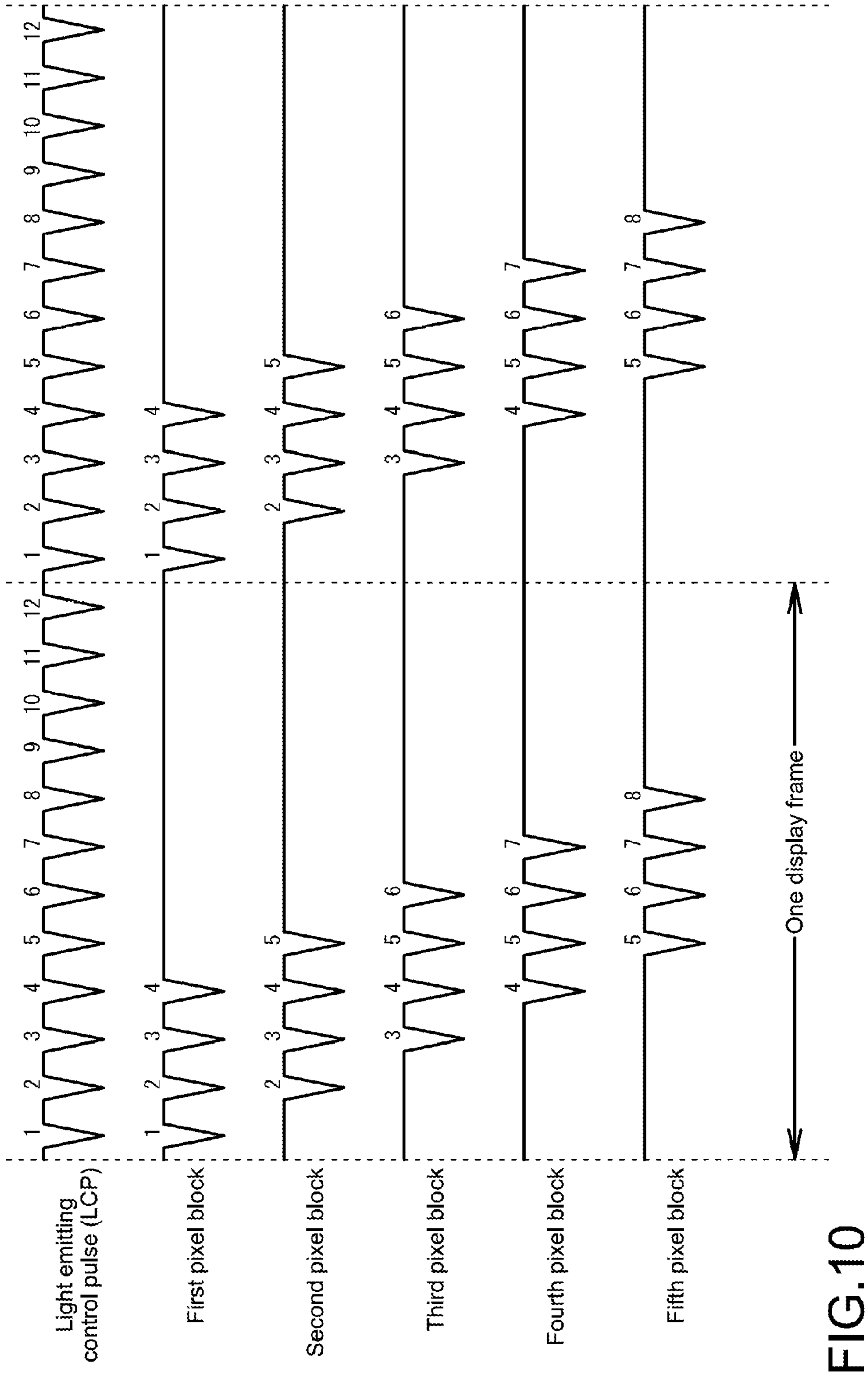
FIG. 10 is a diagram schematically showing supply of a plurality of control pulses to a pixel block in a display apparatus according to a modified example of the example 3.

FIG. 10 is a diagram schematically showing supply of a plurality of control pulses LCP to a pixel block in a display apparatus according to a modified example of the example 3. In this example, P is 5. Specifically, the first pixel block includes first to two hundred sixteenth pixel groups, the second pixel block includes two hundred seventeenth to four hundred thirty second pixel groups, the third pixel block includes four hundred thirty third to six hundred forty eighth pixel groups, the fourth pixel block includes six hundred forty ninth to eight hundred sixty fourth pixel groups, the fifth pixel block includes eight hundred sixty fifth to one thousand eightieth pixel blocks.

Also in the example shown in FIG. 10, in the pixel block light emitting period of time, four control pulses LCP are transmitted to all pixels 1 constituting each pixel block, and each pixel 1 is caused to emit light four times. In one display frame, 12 control pulses LCP are supplied to 5 pixel blocks. Then, the number of control pulses LCP in one display frame is larger than the number of control pulses LCP supplied to the drive circuit 11 in one display frame. Specifically, also in the example shown in FIG. 10, the number of control pulses LCP in one display frame is 12, and the number of control pulses LCP supplied to the drive circuit 11 in one display frame is 4. It should be noted that unlike the example shown in FIG. 9, some pixel blocks are not caused to emit light in one display frame. In adjacent pixel blocks, 3 control pulses LCP are overlaid one on the other. Then, in 5 pixel blocks, up to 4 pixel blocks are caused to emit light simultaneously. As described above, because more pixel blocks than those shown in FIG. 9 are caused to emit light simultaneously, it is possible to improve the quality of image display.

Although the present disclosure has been described on the basis of favorable examples, the present disclosure is not limited to the examples. The configuration, structure, light emitting unit, and drive circuit of the display apparatus described in the examples and, various circuits provided in the display apparatus are given for exemplary purposes, and can be changed appropriately. In the examples, an n-channel type signal write transistor and a p-channel type light emitting driving transistor are used. However, the conductive type of the channel forming area of the transistor is not limited thereto, and the waveform of the control pulse is not limited to the waveform described in the examples.

It should be noted that the present disclosure may also take the following configurations.

(A01) A display apparatus, including a plurality of pixels arranged in a two-dimensional matrix pattern, each of the plurality of pixels including a light emitting unit and a drive circuit configured to drive the light emitting unit, the drive circuit including a comparator circuit configured to compare a control pulse with a potential based on a signal voltage and to output a predetermined voltage based on the comparison result, a transistor for driving a light emitting unit configured to drive the light emitting unit in response to the predetermined voltage output from the comparator circuit, and a current source configured to supply a current to the light emitting unit during driving of the transistor for driving a light emitting unit, the current source including a current source transistor configured to output the current, a capacity unit connected to a gate electrode of the current source transistor, a differential amplifier configured to detect a differential between a voltage based on a reference constant current and a reference voltage, and a transistor configured to control the voltage based on a reference constant current depending on a current flowing through the current source transistor, the current source being configured to control a gate potential of the current source transistor on the basis of an output of the differential amplifier in synchronization with a scanning signal.

(A02) The display apparatus according to (A01) above, in which the reference constant current is supplied to the current source of each pixel through a current supply line provided for each column of the plurality of pixels arranged in a two-dimensional matrix pattern.

(A03) The display apparatus according to (A01) or (A02) above, in which the output of the differential amplifier is supplied to the gate electrode of the current source transistor via a transistor that turns on and off in synchronization with the scanning signal.

(A04) The display apparatus according to any one of (A01) to (A03) above, in which the plurality of pixels are arranged in a first direction and a second direction in a two-dimensional matrix pattern, a group of the plurality of pixels is divided into p pixel blocks along the first direction, and the light emitting units of each pixel block are driven to simultaneously emit light sequentially from the light emitting units constituting pixels of a first pixel block to the light emitting units constituting pixels of a p-th pixel block and, when the light emitting units constituting pixels of a part of pixel blocks are driven to emit light, the light emitting units constituting pixels of the other pixel blocks are not driven to emit light.

(A05) The display apparatus according to any one of (A01) to (A04) above, in which the light emitting unit is configured to emit light a plurality of times on the basis of a plurality of control pulses.

(A06) The display apparatus according to (A05) above, in which a time interval of the plurality of control pulses LCP is constant.

(A07) The display apparatus according to any one of (A01) to (A06) above, in which the number of control pulses in one display frame is greater than the number of control pulses supplied to the drive circuit in the one display frame.

(A08) The display apparatus according to any one of (A01) to (A07) above, in which the light emitting units of at least any one of the pixel blocks are configured to emit light in one display frame.

(A09) The display apparatus according to any one of (A01) to (A07) above, in which the light emitting units of at least one of the pixel blocks are not caused to emit light in one display frame.

(A10) The display apparatus according to any one of (A01) to (A09) above, further including a control pulse generating circuit configured to generate a control pulse having a voltage with a saw-tooth waveform.

(A11) The display apparatus according to any one of (A01) to (A10) above, in which an absolute value of a voltage of the control pulse increases and then decreases as time passes.

(A12) The display apparatus according to (A11) above, in which gamma correction is performed with the voltage of the control pulse that changes as time passes.

(A13) The display apparatus according to (A12) above, in which an absolute value of a change rate of the voltage of the control pulse with time being a variable is proportional to a constant 2.2.

(A14) The display apparatus according to any one of (A01) to (A13) above, in which the light emitting unit includes a light emitting diode.

(B01). A display apparatus, including a plurality of pixels arranged in a two-dimensional matrix pattern, each of the plurality of pixels including a light emitting unit and a drive circuit configured to drive the light emitting unit, the drive circuit including a comparator circuit configured to compare a control pulse with a potential based on a signal voltage and to output a predetermined voltage based on the comparison result, a transistor for driving a light emitting unit configured to drive the light emitting unit in response to the predetermined voltage output from the comparator circuit, and a current source configured to supply a current to the light emitting unit during driving of the transistor for driving a light emitting unit, the current source including a current source transistor configured to output the current, and a capacity unit connected to a gate electrode of the current source transistor, the current source being configured to supply a voltage set for each pixel to the gate electrode of the current source transistor in synchronization with a scanning signal.

(B02) The display apparatus according to (B01) above, in which the voltage supplied to the gate electrode of the current source transistor is set corresponding to variations in characteristics of the current source transistors of the plurality of pixels.

(B03) The display apparatus according to (B01) or (B02) above, in which the voltage supplied to the gate electrode of the current source transistor is set corresponding to variations in characteristics of the light emitting units of the plurality of pixels.

(B04) The display apparatus according to any one of (B01) to (B03) above, in which the plurality of pixels are arranged in a first direction and a second direction in a two-dimensional matrix pattern, a group of the plurality of pixels is divided into p pixel blocks along the first direction, and the light emitting units of each pixel block are driven to simultaneously emit light sequentially from the light emitting units constituting pixels of a first pixel block to the light emitting units constituting pixels of a p-th pixel block and, when the light emitting units constituting pixels of a part of pixel blocks are driven to emit light, the light emitting units constituting pixels of the other pixel blocks are not driven to emit light.

(B05) The display apparatus according to any one of (B01) to (B04) above, in which the light emitting unit is configured to emit light a plurality of times on the basis of a plurality of control pulses.

(B06) The display apparatus according to (B05) above, in which a time interval of the plurality of control pulses LCP is constant.

(B07) The display apparatus according to any one of (B01) to (B06) above, in which the number of control pulses in one display frame is greater than the number of control pulses supplied to the drive circuit in the one display frame.

(B08) The display apparatus according to any one of (B01) to (B07) above, in which the light emitting units of at least any one of the pixel blocks are configured to emit light in one display frame.

(B09) The display apparatus according to any one of (B01) to (B07) above, in which the light emitting units of at least one of the pixel blocks are not caused to emit light in one display frame.

(B10) The display apparatus according to any one of (B01) to (B10) above, further including a control pulse generating circuit configured to generate a control pulse having a voltage with a saw-tooth waveform.

(B11) The display apparatus according to any one of (B01) to (B10) above, in which an absolute value of a voltage of the control pulse increases and then decreases as time passes.

(B12) The display apparatus according to (B11) above, in which gamma correction is performed with the voltage of the control pulse that changes as time passes.

(B13) The display apparatus according to (B12) above, in which an absolute value of a change rate of the voltage of the control pulse with time being a variable is proportional to a constant 2.2.

(B14) The display apparatus according to any one of (B01) to (B13) above, in which the light emitting unit includes a light emitting diode.

It should be understood by those skilled in the art that various modifications, combinations, sub-combinations and alterations may occur depending on design requirements and other factors insofar as they are within the scope of the appended claims or the equivalents thereof.

What is claimed is:

1. A display apparatus, comprising a plurality of pixels arranged in a two-dimensional matrix pattern, each of the plurality of pixels including a light emitting unit and a drive circuit configured to drive the light emitting unit, the drive circuit including a comparator circuit configured to compare a control pulse with a potential based on a signal voltage and to output a predetermined voltage based on the comparison result, a transistor for driving the light emitting unit configured to drive the light emitting unit in response to the predetermined voltage output from the comparator circuit, and a current source configured to supply a current to the light emitting unit during driving of the transistor for driving the light emitting unit, the current source including a current source transistor configured to output the current, a capacity unit connected to a gate electrode of the current source transistor, a differential amplifier configured to detect a differential between a voltage based on a reference constant current and a reference voltage, and a transistor configured to control the voltage based on a reference constant current depending on the current flowing through the current source transistor, the current source being configured to control a gate potential of the current source transistor on the basis of an output of the differential amplifier in synchronization with a scanning signal.

2. The display apparatus according to claim 1, wherein the reference constant current is supplied to the current source of each pixel through a current supply line provided for each column of the plurality of pixels arranged in a two-dimensional matrix pattern.

3. The display apparatus according to claim 1, wherein the output of the differential amplifier is supplied to the gate electrode of the current source transistor via a second transistor that turns on and off in synchronization with the scanning signal.

4. The display apparatus according to claim 1, wherein the plurality of pixels are arranged in a first direction and a second direction in a two-dimensional matrix pattern, a group of the plurality of pixels is divided into p pixel blocks along the first direction, and the light emitting units of each pixel block are driven to simultaneously emit light sequentially from the light emitting units constituting pixels of a first pixel block to the light emitting units constituting pixels of a p-th pixel block and, when the light emitting units constituting pixels of a part of pixel blocks are driven to emit light, the light emitting units constituting pixels of the other pixel blocks are not driven to emit light.

5. The display apparatus according to claim 4, wherein the light emitting units of at least any one of the pixel blocks are configured to emit light in one display frame.

6. The display apparatus according to claim 4, wherein the light emitting units of at least one of the pixel blocks are not caused to emit light in one display frame.

7. The display apparatus according to claim 1, wherein the light emitting unit of at least some of the plurality of pixels is configured to emit light a plurality of times on the basis of a plurality of control pulses.

8. The display apparatus according to claim 1, wherein the number of control pulses in one display frame is greater than the number of control pulses supplied to the drive circuit in the one display frame.

9. The display apparatus according to claim 1, wherein an absolute value of a voltage of the control pulse increases and then decreases as time passes.

10. The display apparatus according to claim 1, wherein the light emitting unit includes a light emitting diode.

* * * * *